United States Patent Office 3,825,431
Patented July 23, 1974

---

3,825,431
PRINT PASTES
Guenter Uhl, Worms, and Knut Oppenlaender, Rolf Fikentscher, and Richard Mueller, Ludwigshafen, Germany, assignors to Badische Anilin- & Soda-Fabrik Aktiengesellschaft, Ludwigshafen (Rhine), Germany
No Drawing. Filed Mar. 15, 1972, Ser. No. 234,991
Int. Cl. C09d 11/00, 11/02, 11/16
U.S. Cl. 106—20                                      6 Claims

ABSTRACT OF THE DISCLOSURE

Print pastes based on oil-in-water emulsions which contain esterification products of oxyalkylated alcohols as defoamers in addition to auxiliaries conventionally used in print pastes.

---

The invention relates to print pastes based on oil-in-water emulsions which contain special highly effective defoamers as well as auxiliaries conventionally used in print pastes.

The use of oil-in-water emulsions as thickening agents for textile print pastes is known. Such emulsions having a thickening effect are mainly used in pigment printing but are also often used in other fields of textile printing.

The production of these print pastes has however been troublesome because the emulsions have a strong tendency to foam. Conventional defoamers such as are used in the textile industry do not offer any guarantee that the print pastes will not undergo change in their effectiveness. In particular there is a risk that by adding components which have a defoaming effect, an emulsion-breaking effect is also produced so that the emulsions are broken again. It it known that emulsifiers when they are not added in specific amounts may assume the opposite properties, i.e. the emulsifying components may become breaking components. It has therefore not yet been possible in industry to suitably modify the foaming properties of a print paste which contains emulsifying components.

The object of the invention is to provide a print paste such as is prepared for example according to U.S. Patent Application Ser. No. 196,200 with an addition which will enable the print pastes to be handled in the manufacture without foaming.

According to this invention there is added to a print paste from 0.01 to 0.15% by weight (based on the finished print paste) of a derivative of a block copolymer of ethylene oxide and 1,2-propylene oxide of the general formula (Ia) or (Ib):

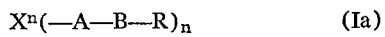

$$X^n(\!-\!A\!-\!B\!-\!R)_n \qquad (Ia)$$

$$X^n(\!-\!B\!-\!A\!-\!R)_n \qquad (Ib)$$

in which $X^n$ is the radical of an $n$-valent aliphatic alcohol of two to six carbon atoms, $n$ is an integer of from 2 to 6, A is a polyethylene oxide block of mean molecular weight $M_A=400$ to 6000 and B is a poly-1,1-propylene oxide block of mean molecular weight $M_B=400$ to 6000 and R is the acyl radical of a fatty acid of two to twenty-four carbon atoms.

These additives (which according to German Laid-Open Specification No. 1,595,369 may be used as defoamers particularly in the production of paper and which at the same time may act—as polyalkylene glycol ether derivatives—also as demulsifiers) give rise in the print pastes according to the invention to a pronounced defoaming effect without demulsifying the oil-in-water emulsion which has been produced by closely limited amounts of an emulsifier, although about twice the amount of surface-active substance is present in the system in the form of these additives. It has hitherto been assumed that these foam-preventing substances could only be used in purely aqueous systems such as are customary in the paper industry.

The oil-in-water emulsions required for the production of the print pastes according to the invention generally consist of water and an organic solvent or mixture of organic solvents which is not miscible with water and which has a boiling temperature of from 80° to 200° C. Examples of these are hexanes, heptanes, nonanes, cyclohexylbenzene, toluene, xylene and naphthas or mixtures of the same. Kerosene of the middle oil fraction is particularly suitable.

The print pastes according to the invention contain, in addition to water and the said solvent, an emulsion thickening agent. This is usually a water-soluble or water-swellable thickener such as an alginate, flour ether, starch ether or carboxymethylcellulose. Particularly effective emulsion thickeners are described for example in U.S. Patent Application Ser. No. 196,200. These emulsion thickeners are usually polyalkylene glycol ether derivatives obtained from diisocyanates. They are described in detail in the said patent and may also be used in the same amounts in the print paste according to the invention. The print pastes contain from about 0.02 to 1%, preferably from 0.05 to 0.5%, by weight of the said thickeners, based on the finished print paste, depending on the desired viscosity of the print paste.

Moreover the print pastes according to the invention contain 0.05 to 1.5% by weight, based on the print paste, of a conventional emulsifier based on a nonionic surfactant, for example an oxyalkylated alkylphenol or phenol derivative for maintaining the emulsion. Examples of these are adducts of p-benzyl-o-phenylphenol with 12 moles of ethylene oxide, isononylphenol with 10 to 12 moles of ethylene oxide, or isododecylphenol with 22 moles of ethylene oxide. Furthermore the print pastes may contain binders conventionally used in textile printing such as are described for example in German Pat. No. 1,140,898. Monomers which give copolymers which are soft and elastic at room temperature, for example vinyl esters of higher carboxylic acids, for example, vinyl propionate; acrylic and methacrylic esters such as methyl, ethyl or butyl acrylate or butyl methacrylate; and butadiene and its homologs are preferred for the synthesis of the binder. These may be polymerized alone or mixed together or copolymerized with other monomers, for example with maleic esters, fumaric esters, vinyl ethers, vinyl ketones, styrene, vinyl chloride, vinylidene chloride, vinyl acetate, acrylonitrile and methyl methacrylate. Polymerized units of small amounts of water-soluble polymerizable compounds such as vinylpyrrolidone acrylate, unsaturated acid amides or the N-methylol compounds and N-methylol ethers of these amides may also be contained therein. They may also contain other comonomers containing at least one polymerizable double bond, for example esters of α,β-unsaturated organic acids such as acrylic or methacrylic acid with higher alcohols which have a halogen atom in the β-position to a free hydroxyl group, for example 3-chloropropanediol-1,2, 2,3-dichlorobutanediol-(1,4), 3-chlorobutanetriol-(1,2,4), (1,4)-dichlorobutanediol-(2,3), 3-chloro - 2 - methylpropanediol-(1,2) or 3-chloro - 2 - chloromethylpropanediol-(1,2). The ratios in which these monomers and comonomers are mixed and the percentage thereof in the print paste may be those given in German Pat. No. 1,140,898.

According to the invention, the solvent for the production of the oil-in-water emulsion contains from 0.01 to 0.15% by weight (based on the finished print paste) of a derivative of a block copolymer of ethylene oxide and/or 1,2 propylene oxide of the above formula (Ia) or (Ib).

$X^n$ in the said formulae of the said derivatives is preferably the radical of ethylene glycol, propylene glycol, butylene glycol, hexanediol, glycerol, trimethylolpropane and/or pentaerythritol. Radicals of ethylene glycol, propylene glycol, glycerol, trimethylolpropane and pentaerythritol are of particular interest industrially. $n$ may have the value 2 or 3 or, in the case of pentaerythritol, 4. A is a polyethylene oxide block of a mean molecular weight $M_A$ of 400 to 6000 and B is a poly-1,2-propylene oxide block of a mean molecular weight of $M_B$ of 400 to 6000. Within the preferred range of radicals R are those of stearic acid, palmitic acid and/or coconut fatty acid. The production of these block copolymer derivatives is simple according to the teaching of German Laid-Open Specification No. 1,595,369 and consists in first polyoxyethylating a polyhydric alcohol such as the said ethylene glycol, propylene glycol, glycerol, trimethylolpropane or pentaerythritol and then polyoxypropylating the product, or vice versa, and esterifying the resultant product with one of the said acids.

The emulsion thickening required for the print paste may be produced by stirring the solid product, for example the thickening agent, into the emulsifier solution, allowing it to swell and then emulsifying in the solvent containing the block copolymer derivative to be added according to the invention by stirring. It is also possible however to prepare a liquid mixture from the thickening agent, the emulsifier and some water and to use this mixture in the production of the emulsion thickening.

Conventional nonionic emulsifiers such as those described above, for example reaction products of alkylphenols, arylphenols or fatty alcohols with ethylene oxide, are used for the production of the oil-in-water emulsions. It is preferred to use for the purpose the oxyalkylation products of isononylphenol, decylphenol or isododecylphenol or the corresponding naphthols with about 10 to 30 moles of alkylene oxide. Conventional "classic" thickeners, as for example alginates, starch ethers or carboxymethylcellulose, may also be incorporated into the print pastes according to the invention.

The finished print paste is obtained by a conventional method by stirring together the emulsion thickening (which contains water and solvent and also the emulsifier, the thickener and the defoamer in accordance with the invention) and the pigment or pigment formulation, one of the said binders and if desired an additional, water-soluble thickener and other conventional print paste components. It is also possible however for some of the components of the print paste to be introduced into the aqueous solution of the emulsifier before the solvent is emulsified in. Thickener may also be added subsequently to a print paste which has proved to be too mobile.

A print paste according to the invention may be prepared for example by first preparing a thickener emulsion by mixing together 5 to 10 parts of a nonionic emulsifier, 1 to 5 parts of an emulsion thickener, 285 to 485 of water and 500 parts to 700 parts of kerosene containing 1.0 to 15 parts of the defoamer to be added according to the invention and stirring the whole vigorously. A usual thickener emulsion consists for example of 10 parts of emulsifier, 3 parts of the special emulsion thickener, 287 parts of water, and 700 parts of kerosene, which contains 1.0 to 15, preferably 2 to 6, parts of the defoamer.

A finished pigment print paste for roller printing may be obtained for example by stirring together 60 parts of a pigment formulation (30% of pigment), 790 parts of the abovementioned thickener emulsion, 120 parts of a pigment binder based on one of the abovementioned copolymers in the form of a dispersion and if desired from 10 to 30 parts of an aqueous solution, for example 33.3%, of diammonium hydrogen phosphate as acid donor.

Very level and bright prints are obtained with the print pastes according to the invention. The quality of the prints is excellent both in screen printing and roller printing. The print pastes are however particularly suitable for rotary screen printing. It is an advantage of print pastes according to the invention that in addition to the small amounts of emulsion thickener, such as described for example in German patent application P 20 54 885.0, the print pastes are also very low in foam during their production and in the case of mobile consistency and therefore they are particularly easy to handle during processing. The addition of the defoamer has no effect whatever on the condition of the emulsion.

The print pastes according to the invention may be used mainly for pigment printing for example on cotton, rayon, and other natural and synthetic fibers. It is also possible however to prepare the print pastes according to the invention with conventional dyes, as for example disperse dyes and reactive dyes.

The following Examples illustrate the invention.

The parts and percentages specified in the Examples are by weight.

EXAMPLE 1

600 parts of white spirit of the boiling point 140° to 200° C. which contains 0.15% of an esterification product of trimethylolpropane oxalkylated with 11 moles of ethylene oxide and 50 moles of propylene oxide and esterified with 3 moles of stearic acid is emulsified by high speed stirring into a mixture of:

50 parts of a 5% aqueous solution of carboxymethyl cellulose;
10 parts of the adduct of p-benzyl-o-phenylphenol with 12 moles of ethylene oxide;
30 parts of diammonium phosphate (30% solution in water);
120 parts of a 40% aqueous dispersion of a copolymer of 55% of n-butyl acrylate, 23% of acrylonitrile, 17% of vinyl chloride and 5% of N-methylolmethacrylamide;
20 parts of an 80% aqueous solution of N,N'-dimethylolbutanediol-diurethane;
30 parts of a 25% aqueous paste of Permanent Carmine FB (extra) (C.I. Pigment Red 5—12490); and
140 parts of water.

A low foam print paste is obtained which is easy to process.

EXAMPLE 2

20 parts of a 3% solution of the product according to Example 1 in white spirit is stirred into a print paste consisting of:

40 parts of a 20% aqueous paste of Permanent Yellow HR (C.I. Pigment Yellow 83) and
940 parts of a white spirit-in-water emulsion having a content of 350 parts of white spirit and a solids content of 5.5% of binder consisting of 2.5 parts of ammonium polyacrylate with a content of 0.1% of butanediol diacrylate and 52 parts of a copolymer of 60% of butadiene, 35% of styrene and 5% of N-methylolmethacrylamide and an addition of 1% of the adduct of 25 moles of ethylene oxide to 1 mole of sperm oil alcohol.

A low foam pigment print paste is obtained which is easy to process.

EXAMPLE 3

808 parts of an oil-in-water emulsion is obtained by stirring 75% of white spirit (boiling range 120° to 180° C.) into a solution of 1% of the sodium salt of the acid sulfuric acid ester of the adduct of 60 moles of ethylene oxide to 1 mole of sperm oil alcohol, 0.25% of sodium alginate, 0.05% of ammonia and 1% of ethyl glycol in 22.7% water with a high speed stirrer.

The following are then stirred in successively:

2 parts of a 10% solution of the product according to Example 1 dissolved in toluene;
20 parts of a 33% aqueous dispersion of ammonium sulfate;
130 parts of a 40% aqueous dispersion of a copolymer of 70% of butyl acrylate, 25% of styrene and 5% of N-methylolmethacrylamide;
10 parts of a hexamethylolmelamine hexamethyl ether; and 30 parts of a 26% aqueous paste of Indanthrene Brilliant Rose 3 B (C.I. Vat Red 2—73365).

A low foam print paste is obtained which is easy to process.

EXAMPLE 4

600 parts of white spirit having a boiling range of 140° to 200° C. and containing 0.15% of an esterification product of propylene glycol oxyalkylated with 11 moles of ethylene oxide and 50 moles of propylene oxide and esterified with 2 moles of stearic acid is emulsified with high speed stirring in a mixture of 50 parts of a 5% aqueous solution of carboxymethylcellulose, 10 parts of an adduct of p-benzyl-o-phenylphenol with 12 moles of ethylene oxide, 30 parts of diammonium phosphate (30% in water), 120 parts of a 40% aqueous dispersion of a copolymer of 55% of n-butyl acrylate, 23% of acrylonitrile, 17% of vinyl chloride and 5% of N-methylolmethacrylamide, 20 parts of an 80% aqueous solution of N,N'-dimethylolbutanediol -diurethane, 30 parts of a 25% aqueous paste of Permanent Carmine FB (extra) (C.I. Pigment Red 5—12490) and 140 parts of water. A low foam print paste is obtained which can be processed easily.

EXAMPLE 5

20 parts of a 3% solution of the product according to Example 4 is stirred into a print paste consisting of 40 parts of a 20% aqueous paste of Permanent Yellow HR (C.I. Pigment Yellow 83) and 940 parts of a white spirit-in-water emulsion having a content of 350 parts of white spirit and a solids content of 5.5% of binder consisting of 2.5 parts of ammonium polyacrylate with a content of 0.1% of butanediol diacrylate and 52 parts of a copolymer of 60% of butadiene, 35% of styrene and 5% of N-methylolmethacrylamide and also an addition of 1% of the adduct of 25 moles of ethylene oxide to 1 mole of sperm oil. A low foam pigment print paste is obtained which is easy to process.

EXAMPLE 6

Into 808 parts of an oil-in-water emulsion (obtained by stirring 75% of white spirit (boiling range 120° to 180°) into a solution of 1% of the sodium salt of the acid sulfuric acid ester of the adduct of 60 moles of ethylene oxide to 1 mole of sperm oil alcohol, 0.25% of sodium alginate, 0.05% of ammonia and 1% of ethyl glycol in 22.7% of water with an impeller) there are stirred successively 2 parts of a 10% solution of the product according to Example 4 dissolved in toluene, 20 parts of a 33% aqueous solution of ammonium sulfate, 130 parts of a 40% aqueous copolymer dispersion from 70% of butyl acrylate, 25% of styrene and 5% of N-methylolmethacrylamide, 10 parts of a hexamethylolmelaminehexamethyl ether and 30 parts of a 26% aqueous paste of Indanthrene Brilliant Rose 3 B (C.I. Vat Red 2—73365).

We claim:
1. A print paste based on an oil-in-water emulsion which contains water, an organic solvent, an emulsion thickening agent, an emulsifier, a dyestuff or pigment and in the case of a pigment, a binder and an acid donor, and as a defoamer from 0.01 to 0.15% by weight (based on the finished print paste) of a derivative of a block copolymer of ethylene oxide and 1,2-propylene oxide of the formula (Ia) or (Ib):

$$X^n(A-B-R)_n \qquad (Ia)$$
$$X^n(B-A-R)_n \qquad (Ib)$$

in which $X^n$ is the radical of an $n$-valent aliphatic alcohol of two to six carbon atoms, $n$ is an integer of from 2 to 6, A is a polyethylene oxide block of a mean molecular weight $M_A=400$ to 6000 and B is a poly-1,2-propylene oxide block of a mean molecular weight $M_B=400$ to 6000 and R is the acyl radical of a fatty acid of two to twenty-four carbon atoms.

2. A print paste as claimed in claim 1 in which $n$ in the formula (Ia) or (Ib) is the integer 2.

3. A print paste as claimed in claim 1 in which $n$ in the formula (Ia) or (Ib) is one of the integers 3 to 6.

4. A print paste as claimed in claim 1 in which X in the formula (Ia) or (Ib) is the radical of ethylene glycol, propylene glycol, glycerol, trimethylolpropane or pentaerythritol.

5. A print paste as claimed in claim 1 in which R in the formula (Ia) or (Ib) is the radical of stearic acid, palmitic acid or coconut fatty acid.

6. A print paste as set forth in claim 1 wherein said emulsion includes water and an organic solvent or mixture of organic solvents which is not miscible with water and which has a boiling temperature of from 80° to 200° C.

References Cited

UNITED STATES PATENTS

| | | | |
|---|---|---|---|
| 2,992,198 | 7/1961 | Funahashi | 106—28 |
| 3,446,647 | 5/1969 | Rizner | 106—24 |
| 3,661,793 | 5/1972 | Curtis | 252—358 |
| 3,246,997 | 4/1966 | Sumner | 106—24 |
| 3,504,041 | 3/1970 | Weipert | 252—358 |
| 3,730,894 | 5/1973 | Heilweil et al. | 252—358 |
| 2,923,686 | 2/1960 | Ohlmann | 252—358 |
| 2,881,204 | 4/1959 | Kirkpatrick | 252—358 |
| 2,914,412 | 11/1959 | Stephan | 252—358 |
| 3,729,387 | 4/1973 | Naschke | 252—358 |
| 2,809,168 | 10/1957 | Hlavacek | 252—358 |
| 2,849,405 | 8/1958 | Shott et al. | 252—358 |
| 2,992,198 | 7/1961 | Funahashi | 106—28 |

FOREIGN PATENTS

| | | | |
|---|---|---|---|
| 1,557,086 | 2/1969 | France | 106—22 |
| 1,140,898 | 4/1963 | Germany | 106—22 |

JOSEPH L. SCHOFER, Primary Examiner

T. S. GRON, Assistant Examiner

U.S. Cl. X.R.

106—22, 23, 24, 26, 29, 32; 252—358

UNITED STATES PATENT AND TRADEMARK OFFICE
CERTIFICATE OF CORRECTION

PATENT NO. : 3,825,431

DATED : July 23, 1974

INVENTOR(S) : Guenter Uhl, K. Oppenlaender, R. Fikentscher, & Richard Mueller

It is certified that error appears in the above-identified patent and that said Letters Patent are hereby corrected as shown below:

Column 1, in the heading, insert--Claims priority, Application German, March 26, 1971, P 21 14 609.8--.

Signed and Sealed this second Day of December 1975

[SEAL]

Attest:

RUTH C. MASON
*Attesting Officer*

C. MARSHALL DANN
*Commissioner of Patents and Trademarks*